US008391132B2

(12) United States Patent
Scarpa et al.

(10) Patent No.: US 8,391,132 B2
(45) Date of Patent: Mar. 5, 2013

(54) SLOW SPEED MUTE RESISTANCE VIA SELECTIVE COFDM BIN LOADING

(75) Inventors: Carl Scarpa, Plainsboro, NJ (US); Christopher Strolle, Fort Washington, PA (US)

(73) Assignee: Sirius XM Radio Inc., New York, NY (US)

( * ) Notice: Subject to any disclaimer, the term of this patent is extended or adjusted under 35 U.S.C. 154(b) by 190 days.

(21) Appl. No.: 12/415,648

(22) Filed: Mar. 31, 2009

(65) Prior Publication Data
US 2009/0245087 A1 Oct. 1, 2009

Related U.S. Application Data

(60) Provisional application No. 61/072,639, filed on Mar. 31, 2008, provisional application No. 61/072,637, filed on Mar. 31, 2008.

(51) Int. Cl.
*H04J 11/00* (2006.01)
*H04W 4/00* (2009.01)
*H04B 7/02* (2006.01)
(52) U.S. Cl. .................. 370/208; 370/334; 375/267
(58) Field of Classification Search .......... 370/203–210, 370/436, 466, 468; 375/260, 267, 347
See application file for complete search history.

(56) References Cited

U.S. PATENT DOCUMENTS

| 6,618,367 | B1 * | 9/2003 | Riazi et al. ................ 370/347 |
| 6,798,791 | B1 * | 9/2004 | Riazi et al. ................ 370/515 |
| 7,359,312 | B2 * | 4/2008 | Riazi et al. ................ 370/208 |
| 2004/0151255 | A1 | 8/2004 | Riazi et al. |
| 2004/0233838 | A1 * | 11/2004 | Sudo et al. ................ 370/208 |
| 2005/0254592 | A1 * | 11/2005 | Naguib et al. ............. 375/267 |
| 2009/0180564 | A1 * | 7/2009 | Celebi et al. ............... 375/260 |
| 2010/0271930 | A1 * | 10/2010 | Tong et al. ................ 370/208 |

OTHER PUBLICATIONS

International Search Report and Written Opinion of the International Searching Authority, issued for corresponding PCT Application PCT/US2009/038982, dated Jun. 9, 2009.

* cited by examiner

*Primary Examiner* — Habte Mered
(74) *Attorney, Agent, or Firm* — Kramer Levin Naftalis & Frankel LLP

(57) ABSTRACT

Systems and methods are presented for improving the ability to withstand slow speed mute via diversity transmission while avoiding loss in link level margin. In exemplary embodiments of the present invention, systems and methods are presented for improving resistance to slow speed muting by employing transmit diversity where a second signal is not a replica of the original signal. The second signal can be generated, for example, by using only a COFDM FFT bin that contained the cluster sync bit while setting all other bins to zero. That is, only the spectral portion of interest of the COFDM signal need be utilized. In such exemplary embodiments, the same frequency and time delay offset can be used as in current systems and methods, except that the replica COFDM signal can, for example, consist of only one populated FFT bin.

13 Claims, 4 Drawing Sheets

REPRESENTATION OF COFDM MULTI-PATH DEPLOYMENTS

SIRIUS COFDM SYMBOL FRAMING STRUCTURE

COFDM FRAME FORMAT

REPRESENTATION OF COFDM MULTI-PATH DEPLOYMENTS

SLOW SPEED MUTE RESISTANCE VIA SELECTIVE COFDM BIN LOADING

CROSS REFERENCE TO RELATED APPLICATIONS

This application claims the benefit of and hereby incorporates by reference U.S. Provisional Patent Application No. 61/072,639 entitled "IMPROVING SLOW SPEED MUTE RESISTANCE VIA SELECTIVE COFDM BIN LOADING", filed on Mar. 31, 2008, and U.S. Provisional Patent Application No. 61/072,637 entitled "OVERLAY MODULATION OF COFDM USING PHASE AND AMPLITUDE OFFSET CARRIERS", filed on Mar. 31, 2008.

TECHNICAL FIELD

The present invention relates to satellite broadcast communications, and more particularly to systems and methods for improving the ability to withstand a slow speed mute via diversity transmission while avoiding loss in link level margin.

BACKGROUND INFORMATION

Existing satellite broadcast communication systems, such as, for example, that currently utilized by Sirius Satellite Radio, employ two forms of modulation to convey information, namely, single carrier Quadrature Phase Shift Keying (QPSK) and multicarrier differential Coded Orthogonal Frequency Division Multiplexing (COFDM).

QPSK is a modulation technique that allows for the transmission of digital information across an analog channel. Data bits are grouped into pairs with each pair represented by a particular waveform, commonly referred to as a symbol. There are four possible combinations of data bits in a pair, and a unique symbol is required for each possible combination of data bits in a pair. QPSK creates four different symbols, one for each pair, by changing the I gain and Q gain for the respective cosine and sine modulators. The symbol is then sent across the analog channel after modulating a single carrier. A receiver will then demodulate the received signal and look at the recovered symbol to determine which combination of data bits was sent.

COFDM is a modulation technique that distributes a single digital signal across 1,000 or more signal carriers simultaneously. Coded data is modulated and inserted into orthogonal carriers in the frequency domain. Because signals are sent at right angles to each other, the signals do not interfere with one another. Multi-path effects describes the scattering of a signal due to obstructions such as, for example, canyons, buildings, etc., which can introduce distortions and "ghosting." Multi-path effects can cause a signal to take two or more paths to reach its final destination. COFDM is highly resistant to multi-path effects because it uses multiple carriers to transmit the same signal.

Existing satellite broadcast communications systems place a key synchronization signal (known as a cluster synchronization signal) in a fixed frequency domain COFDM bin location, such as, for example, the first of the 1,000 or more signal carriers. That is, in such systems, the cluster synchronization signal does not use any of the significant frequency diversity that is available in a COFDM system. An unfortunate consequence of this scheme is that when a receiver, such as a satellite radio, for example, experiences a constant or slow moving multi-path null in the vicinity of this frequency domain bin, detection of the key synchronization signal is degraded and often impossible to detect. This problem is known as "slow speed mute." Because proper detection of the cluster synchronization signal is critical for proper signal acquisition and decoding, slow speed mute can cause a complete loss of all possible data reception.

In some systems, slow speed mute is currently addressed by employing transmitter diversity at each COFDM repeater site utilizing a second broadcasted signal as a copy of the first COFDM signal, but offset in frequency by 40 Hz and time delayed by 1 μs. The resulting signal at every receiver will at least be a sum of the original signal and such second offset signal of essentially the same power (scaled according to the path gain of each transmit signal, which is usually equal, as well as the normal channel reception characteristics of each receiver). This transmitter diversity scheme causes a self induced time varying multi-path across the entire spectrum of the COFDM signal (i.e., as if a 1 μs, 0 dB down reflection of the original signal existed). Because the transmitter cannot determine the phase angle of arrival of each receiver—and, thus, will not know if the self induced multi-path is possibly adding to, or ameliorating, a slow speed mute problem—the frequency offset on the second signal ensures that a phase rotation of the second received signal will "roll" the self induced multi-path nulls across the received spectrum at a rate of the frequency offset of 40 Hz. This time varying signal ensures that the cluster sync bin "sees" a time varying signal in its respective (Fast Fourier Transform) FFT bin, essentially averaging out any fixed multi-path null caused by the channel. This induced multi-path makes the FFT cluster bin much less likely to be "stuck" in a multi-path null, providing a method for detecting the key cluster bit synchronization signal. Unfortunately, the purposely induced multi-path not only affects the cluster sync bin but each FFT bin that comprises the COFDM signal as well. The self induced multi-path is 0 dB down in amplitude, which reduces the entire link margin of the signal. This effect creates a lack of coverage area due to the now combined effect of signal plus self induced multi-path distortion.

What is needed in the art is an alternative implementation of diversity transmission that can address slow speed mute and at the same time overcome or ameliorate the problems of such conventional systems and techniques.

SUMMARY OF THE INVENTION

Systems and methods are presented for improving the ability to withstand slow speed mute via diversity transmission while avoiding loss in link level margin. In exemplary embodiments of the present invention, systems and methods are presented for improving resistance to slow speed muting by employing transmit diversity where a second signal is not a replica of the original signal. The second signal can be generated, for example, by using only a COFDM FFT bin that contained the cluster sync bit while setting all other bins to zero. That is, only the spectral portion of interest of the COFDM signal need be utilized. In such exemplary embodiments, the same frequency and time delay offset can be used as in current systems and methods, except that the replica COFDM signal can, for example, consist of only one populated FFT bin.

DETAILED DESCRIPTION OF THE INVENTION

Figure 1:
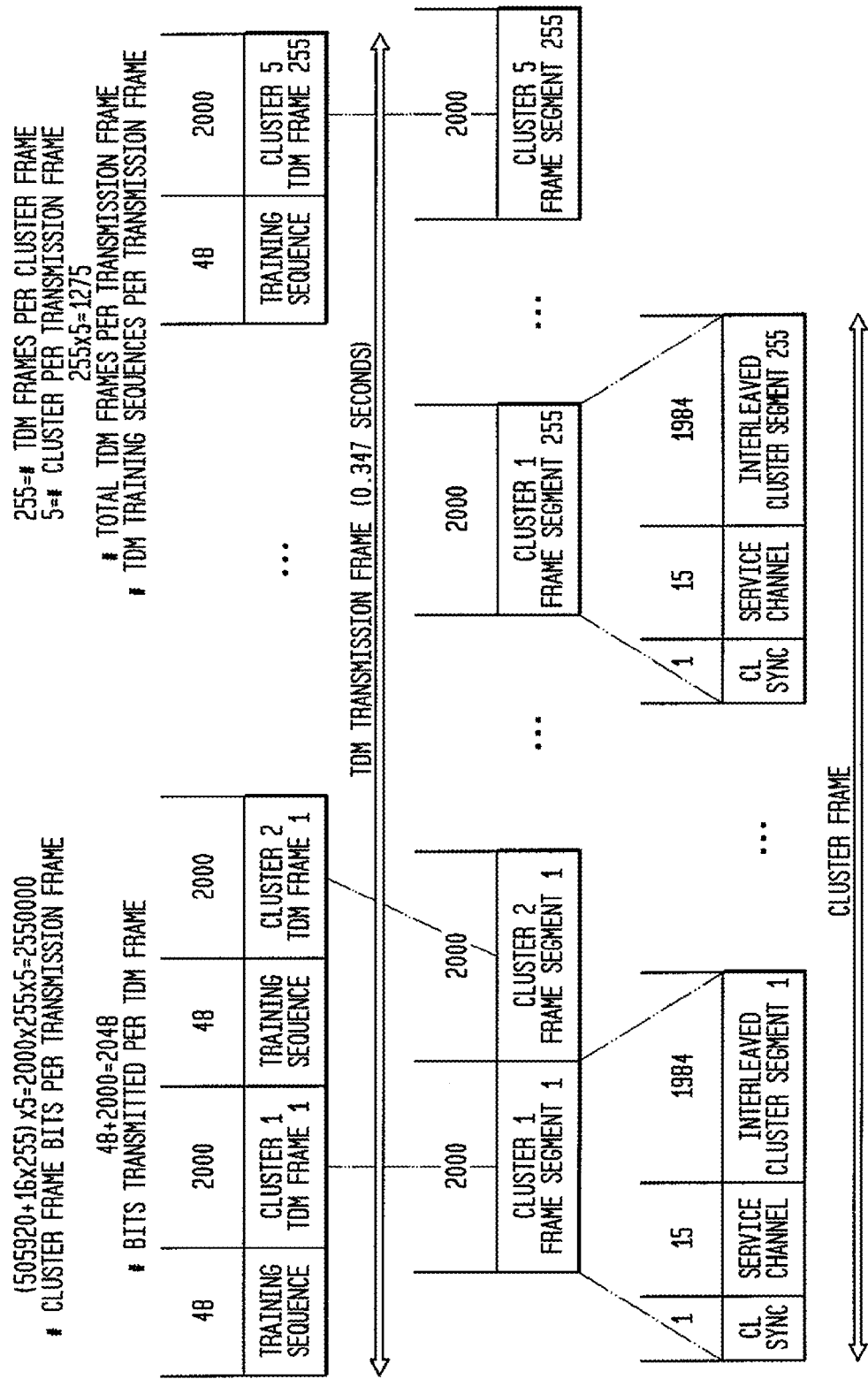
FIG. 1 illustrates an exemplary TDM Frame Format for a satellite radio broadcast signal.
Figure 3:
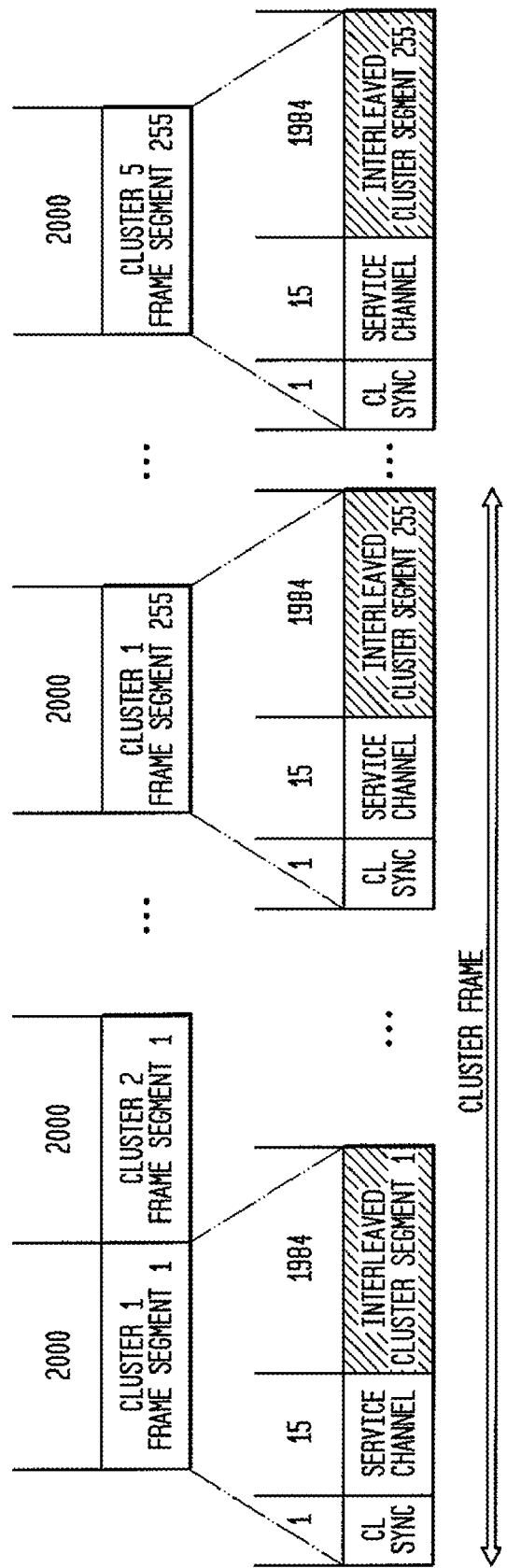
FIG. 3 illustrates an exemplary COFDM frame format according to an exemplary embodiment of the present invention.

Satellite broadcast communication systems, such as, for example, that provided by Sirius XM Radio, employ a hybrid mix of satellite and terrestrial based ground repeaters. For example, at any given time, a receiver utilizing the Sirius Satellite Digital Audio Radio Service (SDARS) architecture can receive up to three distinct signals. Two of the three signals are QPSK modulated signal carriers transmitted directly from satellites. The third signal comprises differential QPSK symbols encoded using COFDM, transmitted by terrestrial repeaters. FIGS. 1 and 3 respectively depict the TDM and COFDM frame formats currently used in SDARS. To obtain the best possible service, it is often highly desirable to combine all three streams (if available) to minimize channel distortions.

To achieve such a goal, all three received signals must be properly time aligned. In order to align multiple signal streams for maximum signal combining gain (also known as "MRC" or Maximum Ratio Combining gain), robust time of arrival (TOA) markers must be embedded within each data stream. In SDARS, a 255-bit pseudo-random noise (PN) sequence is embedded within each of the three signals, and a correlation circuit matched to this sequence is used in each receiver to determine the exact time of arrival for each signal. With each signal delay identified, the delays can be summed coherently to provide diversity gain. The 255-bit PN sequence is distributed over time within each transmission frame, where approximately three transmission frames are transmitted per second. These 255-bit PN sequences are seen in each of FIGS. 1 and 3 as the "cluster sync" bit prepended to each interleaved cluster segment (see bottom row of each figure). With reference to FIG. 1, a TDM frame comprises 5 cluster frames, and each cluster frame contains a full 255-bit sync sequence. A similar structure is used in the COFDM frame, as shown in FIG. 3.

As discussed above, in COFDM, coded data is modulated and inserted into orthogonal carriers in the frequency domain. A time waveform is then created by taking an inverse Fast Fourier Transform (FFT) of the modulated carriers and appending a cyclic prefix of the result, known as the guard interval.

In COFDM, a COFDM carrier signal is the sum of a number of orthogonal sub-carriers, with baseband data on each sub-carrier being independently modulated commonly using some type of quadrature amplitude modulation (QAM) or phase-shift keying (PSK). This composite baseband signal is typically used to modulate a main RF carrier. So, for s[n], a serial stream of binary digits, by inverse multiplexing, these digits are first demultiplexed into N parallel streams, and each one mapped to a (possibly complex) symbol stream using some modulation constellation (QAM, PSK, etc.). Note that the constellations may be different, so some streams may carry a higher bit-rate than others.

An inverse FFT is computed on each set of symbols, giving a set of complex time-domain samples. These samples are then quadrature-mixed to passband in the standard way. The real and imaginary components are first converted to the analogue domain using digital-to-analogue converters (DACs); the analogue signals are then used to modulate cosine and sine waves at the carrier frequency, fc, respectively. These signals are then summed to give a transmission signal, s(t).

The receiver picks up the signal r(t), which is then quadrature-mixed down to baseband using cosine and sine waves at the carrier frequency. This also creates signals centered on 2fc, so low-pass filters are used to reject these. The baseband signals are then sampled and digitised using analogue-to-digital converters (ADCs), and a forward FFT is used to convert back to the frequency domain. This returns N parallel streams, each of which is converted to a binary stream using an appropriate symbol detector. These streams are then re-combined into a serial stream, s[n] which is an estimate of the original binary stream at the transmitter.

Figure 2:
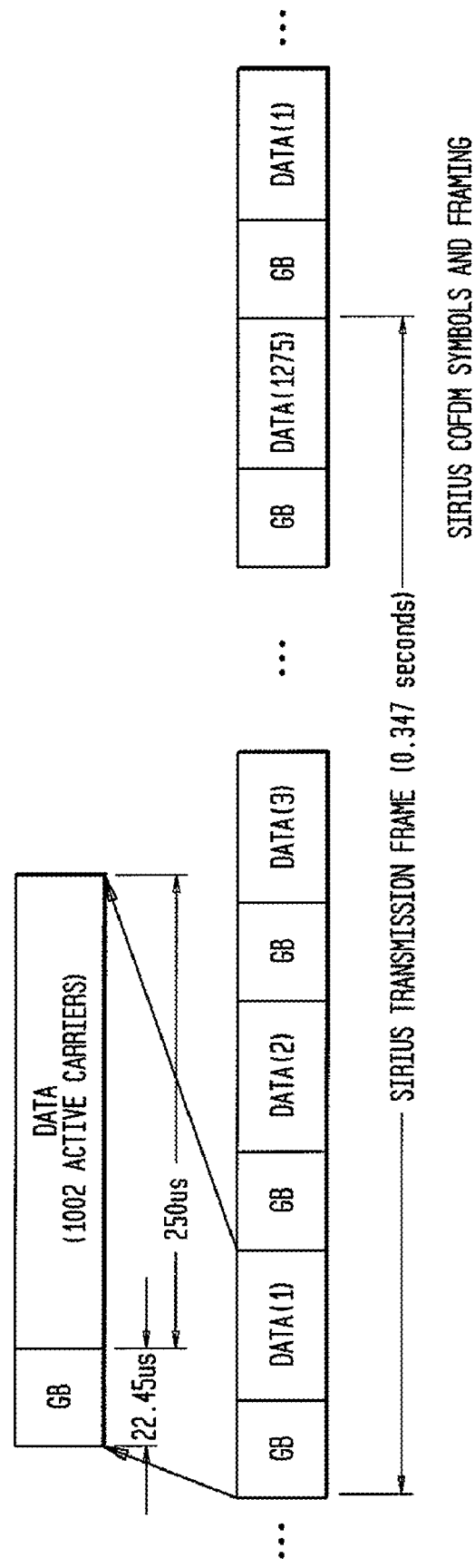
FIG. 2 illustrates an exemplary COFDM symbol framing structure according to an exemplary embodiment of the present invention.

Thus, in exemplary embodiments of the present invention, COFDM signal generation starts when data bits are loaded into the I and Q components (the in-phase data and the quadrature data, respectively) of an FFT data bin. An inverse FFT is performed, and a guard band interval is added. FIG. 2 depicts an exemplary COFDM symbol framing structure, showing a guard band interval ("GB") followed by data bits. The signal is conditioned, amplified and then transmitted. When loading of the FFT data bins is performed, the cluster synchronization bit sequence is mapped to a single, unchanging FFT bin for all FFT operations performed. This is unlike the data to be transmitted, which is frequency multiplexed over many FFT bins. This signal structure wherein the critical time of arrival (TOA) synchronization pattern is placed within a fixed bin suffers from the possibility of being completely nulled by the frequency selective channel of a terrestrial radio system. Certain multi-path conditions may produce deep spectral nulls that are centered about the single FFT bin used to carry the cluster synchronization information. Typically in a mobile environment, such as a vehicle, the multi-path nulls are constantly moving in frequency, which avoids the problem of always nulling the cluster synchronization bin. But as the vehicle slows or stops, the problem can reappear and produce a synchronization bin null of sufficiently long duration to make detection of the cluster synchronization bin difficult or impossible.

As discussed above, the current art avoids this problem with slow speed mute by using transmit diversity where a signal sent to a second antenna is a copy of a signal sent to a first antenna, but delayed and frequency offset. This transmit diversity produces at each receiver what appears to be a time varying, multi-path corrupted signal (summed with the normal terrestrial channel effects). Producing this time varying multi-path has a very high likelihood of canceling a stationary multi-path reflection caused by the terrestrial environment that has nulled the cluster synchronization frequency domain bin. A major disadvantage of this solution for slow speed mute is that all data bins will experience the same exact time varying effect of a multi-path null "rolling" across each data bin. This effect is only useful and desirable for the FFT bin that contains the synchronization pattern. As well known in the current art, the end result is that the link margin in a white noise environment is reduced. Each group of FFT data bins that carries useful data will be much closer to the noise floor, due to frequency selective loss of signal across the band. Each data bin which experiences the self induced multi-path nulling will have a much lower reliability measure. The overall effect is a loss in link margin.

In exemplary embodiments of the present invention the above-described slow speed mute problem can be solved by using a modified form of transmitter diversity. In exemplary embodiments of the present invention, a second transmitter can be used to transmit a "replica" signal which only populates the FFT data bin which contains the cluster synchronization bit (population is done in the exact manner as the current art). In such exemplary embodiments, all other FFT data bins in the signal sent by the second transmitter, which would have otherwise been populated, are set to zero. Using the same frequency and time delay offset in the current art (e.g., 40 Hz and 1 microsecond), the self induced time varying multi-path can, for example, no longer occur over the entire COFDM signal bandwidth but instead only over the bandwidth of the one FFT bin of the transmitted second signal which contains the cluster synchronization information. The advantageous time varying nature of the key synchronization bin is still in effect, but the unfortunate side effect of causing data bins of interest to be self nulled is avoided. Thus, in exemplary embodiments according to the present invention slow speed mute is reduced or altogether eliminated more advantageously than in conventional schemes.

A noteworthy benefit of systems and methods according to exemplary embodiments of the present invention is the substantial cost savings that can be realized at each transmitter site. As a result of implementation of exemplary embodiments of the present invention, a reduction in power is possible, thus easing linearity requirements and allowing for cost reduced equipment.

Figure 4:
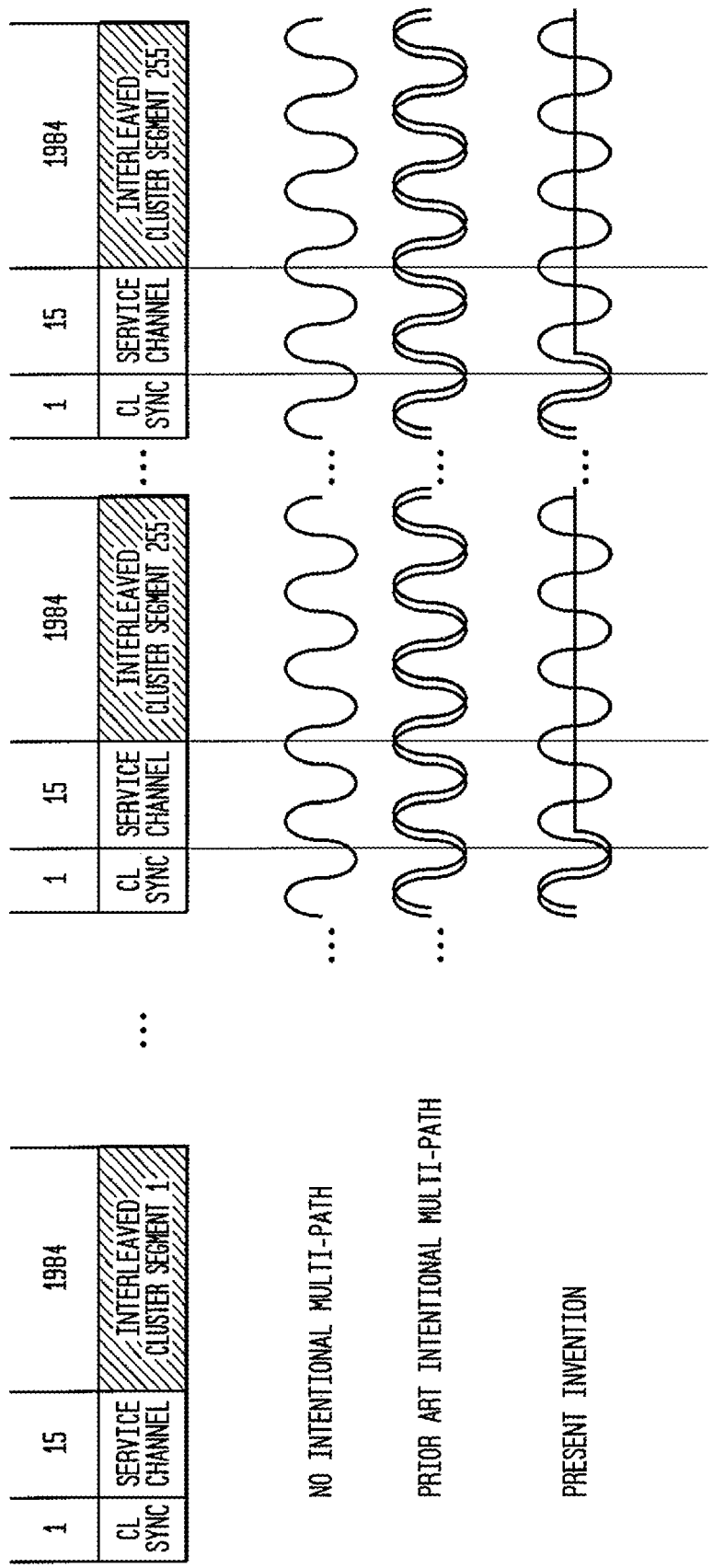
FIG. 4 illustrates various exemplary COFDM multi-path deployments according to an exemplary embodiment of the present invention.

FIG. 4 depicts three different COFDM multi-path deployments. With reference thereto, the top version depicts no intentional multi-path transmission. As noted, this presents no amelioration to any slow speed mute problem. The second version represents the conventional multi-path approach described above, and as noted, a major disadvantage of this solution for slow speed mute is that all data bins will experience the same exact time varying effect of a multi-path null "rolling" across each data bin. Finally, the third version is a multi-path transmission according to an exemplary embodiment of the present invention, where (in this example the synchronization bit was provided in the first FFT bin) for all FFT bins except the first one (containing the synchronization information) the value is zero (shown by the "replica" signal tracking the line y=0).

While the present invention has been described with reference to certain exemplary embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of generating diverse COFDM transmission signals, comprising:
   loading a first FFT cluster bin with cluster synchronization information;
   loading a first set of FFT data bins with data;
   generating a first signal by performing an inverse Fourier transform on said first FFT cluster bin and said first set of FFT data bins;
   loading a second FFT cluster bin with said cluster synchronization information;
   loading a second set of FFT data bins with all zeros;
   generating a second signal by performing an inverse Fourier transform on said second FFT cluster bin and said second set of FFT data bins having all zeros, such that the only information carried in said second signal is said cluster synchronization information; and
   transmitting said first signal from a first transmitter and said second signal from a second transmitter.

2. The method of claim 1 wherein said second signal is offset in frequency from said first signal.

3. The method of claim 1 wherein said second signal is offset in time from said first signal.

4. The method of claim 2, wherein said frequency offset is 40 Hz.

5. The method of claim 3, wherein said time offset is 1 microsecond.

6. A transmission system, comprising:
   a first transmitter;
   a second transmitter;
   wherein the first transmitter transmits a first COFDM signal and the second transmitter transmits a second COFDM signal, said second COFDM signal of identical length as said first COFDM signal, but only being populated in an FFT bin that contains cluster synchronization information, its remaining data bins filled with all zeros, and
   wherein said first COFDM signal and said second COFDM signal are offset from one another in both time and frequency.

7. The transmission system of claim 6, wherein said frequency offset is 40 Hz.

8. The transmission system of claim 6, wherein said time offset is 1 microsecond.

9. The transmission system of claim 6, further comprising first and second signal generators, wherein the first signal generator generates the first COFDM signal, and the second signal generator generates a the second COFDM signal by using only a COFDM FFT bin that contained the cluster synchronization information while setting all other bins to zero.

10. A method of ameliorating slow speed mute effects using transmitter diversity, comprising:
    transmitting a first COFDM signal from a first transmitter, said first COFDM signal having a cluster synchronization bin and a series of data bins; and
    transmitting a second COFDM signal from a second transmitter,
    wherein said second signal only populates a FFT cluster synchronization bin,
    wherein all other FFT data bins in the second signal are set to zero, such that the only information carried in said second signal is said cluster synchronization information; and
    wherein said cluster synchronization information of said second signal is identical to that of said first signal.

11. The method of claim 1, wherein the first signal has only one FFT bin which is provided with the synchronization signal.

12. The method of claim 6, wherein the first COFDM signal has only one FFT bin which is provided with the synchronization signal.

13. The method of claim 10, wherein the first COFDM signal has only one FFT bin is provided with the cluster synchronization signal.

* * * * *